Figure 1:
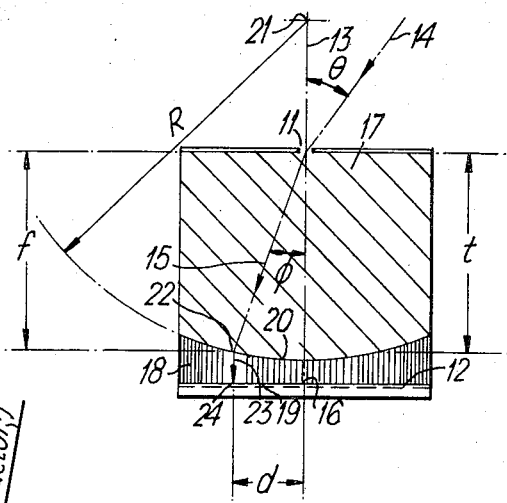

United States Patent [19]

Laws

[11] 3,819,940
[45] June 25, 1974

[54] OPTICAL INSTRUMENTS
[75] Inventor: Arthur Ernest Laws, St. Albans, England
[73] Assignee: Hawker Siddeley Dynamics Limited, Hatfield, Hertfordshire, England
[22] Filed: June 7, 1973
[21] Appl. No.: 367,721

[30] Foreign Application Priority Data
June 8, 1972 Great Britain.................... 13328/72

[52] U.S. Cl................................ 250/227, 250/578
[51] Int. Cl. ............................................ G02b 5/14
[58] Field of Search............................ 250/578, 227

[56] References Cited
UNITED STATES PATENTS
3,260,849  7/1966  Polye .............................. 250/227 X
3,297,388  1/1967  Woodcock et al.............. 250/227 X
3,712,986  1/1973  Collings............................. 250/227

Primary Examiner—James W. Lawrence
Assistant Examiner—T. N. Grigsby
Attorney, Agent, or Firm—Rose & Edell

[57] ABSTRACT

An optical instrument wherein an optical signal is projected on to a sensor array or sensitive medium and angular deflections of the path of the optical signal about an instrument signal source as centre appear as displacements from a datum lying in the general plane of the sensor array or sensitive medium, the instrument having an optical axis passing through said source and normal to said plane, characterized in that, to correct for the tangent law error that would otherwise arise, a correcting optical device is interposed in the signal path and has its surface receiving the signal curved, in the concave sense, about a centre lying on or intersecting the optical axis of the instrument, the curvature being of radius R, where R is greater than the distance $t$ from said instrument signal source to the point in said curved surface that lies on said optical axis, the surface of the correcting optical device facing the sensor array being plane.

9 Claims, 6 Drawing Figures

OPTICAL INSTRUMENTS

This invention relates to means for correcting error occuring in optical signals resulting from the displacemnt of an image across the field of view of a lens or other receiver. A particular application is a sun sensor employed in a satellite as part of an attitude control system but the invention is not limited to this use.

In such apparatus as sun sensors or line scanning equipment when an optical signal having a finite width, such as emanates from a point source, enters the field of view along a path at a varying angle to the optical axis of the instrument, i.e. oblique to the entrance slit, it produces an image element whose distance from the optical axis varies in a non-linear manner. That is to say the image element passes across the sensor or receiving means in accordance with the tangent of the angle of entry. It is an object of the present invention to achieve correction means whereby such non-linearities are substantially overcome.

According to the invention, there is provided an optical instrument wherein an optical signal is projected on to a sensor array or sensitive medium and angular deflections of the path of the optical signal about an instrument signal source as centre appear as displacements from a datum lying in the general plane of the sensor array or sensitive medium, the instrument having an optical axis passing through said source and normal to said plane, characterised in that, to correct for the tangent law error that would otherwise arise, a correcting optical device is interposed in the signal path and has its surface receiving the signal curved, in the concave sense, about a centre lying on or intersecting the optical axis of the instrument, the curvature being of radius R, where R is greater than the distance $t$ from said instrument signal source to the point in said curved surface that lies on said optical axis, the surface of the correcting optical device facing the sensor array being plane.

The correcting optical device may comprise a multiplicity of fibre optical elements all arranged parallel to the optical axis and normal to said plane surface and of varying lengths.

In one form of instrument, the instrument signal source is a slit or a series of parallel slits or a shading edge, upon which falls light from a source external to the instrument, and the curved surface of the correcting optical device is a part-cylindrical surface generated about an axis parallel to the slit or slits or shading edge.

In another form, the instrument signal source is a point source, e.g. a 'pinhole' aperture, and the curved surface of the correcting optical element is a part-spherical surface.

Figure 2:
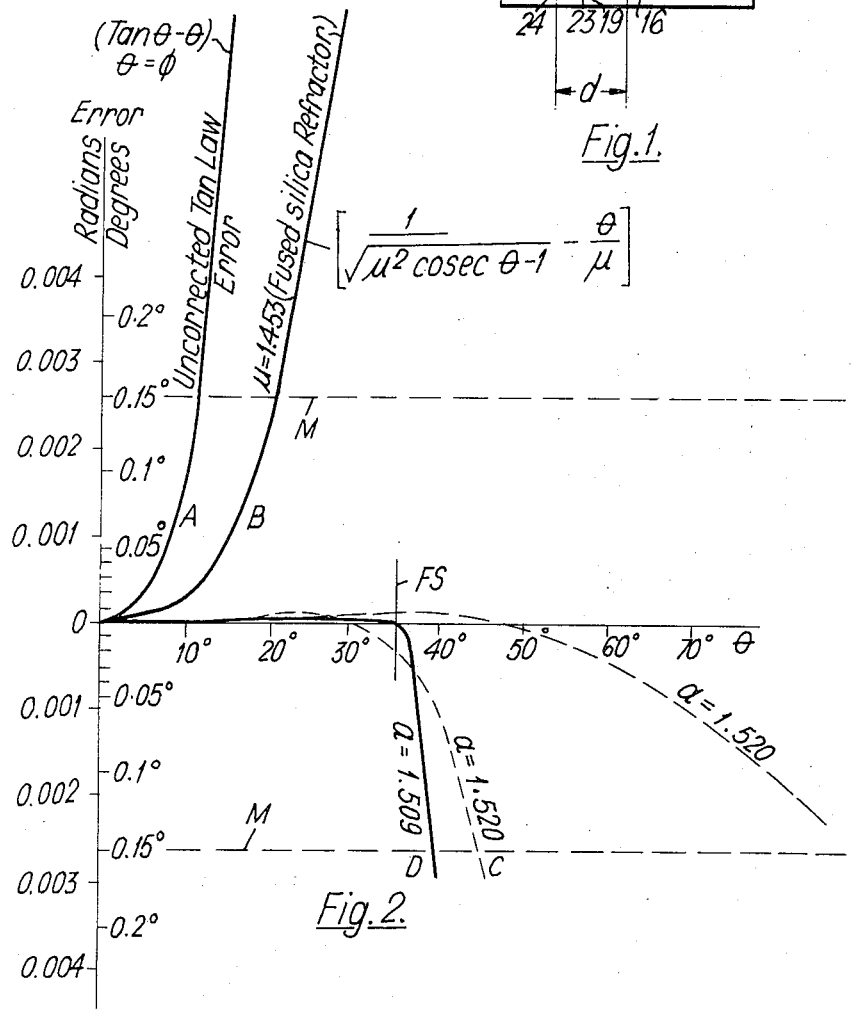
Figures 3, 4, 5:
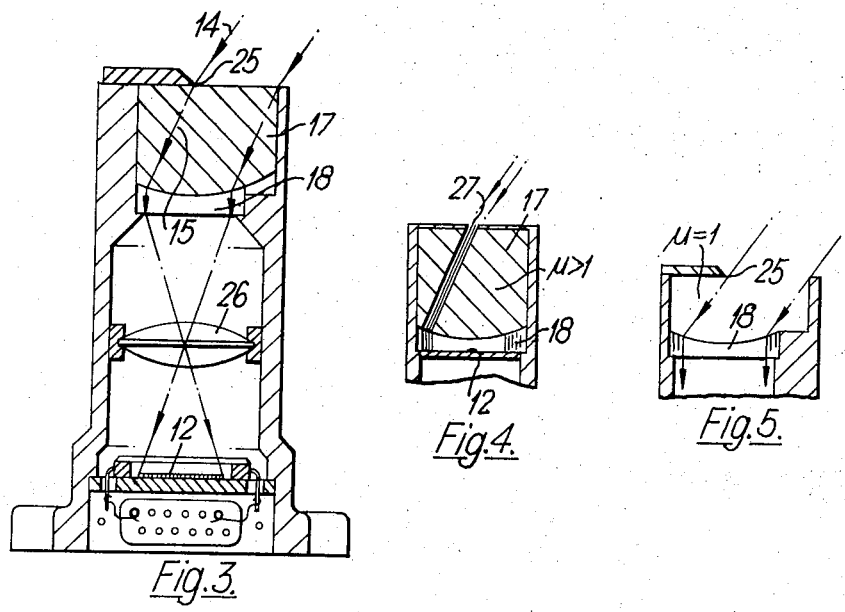
Figure 6:
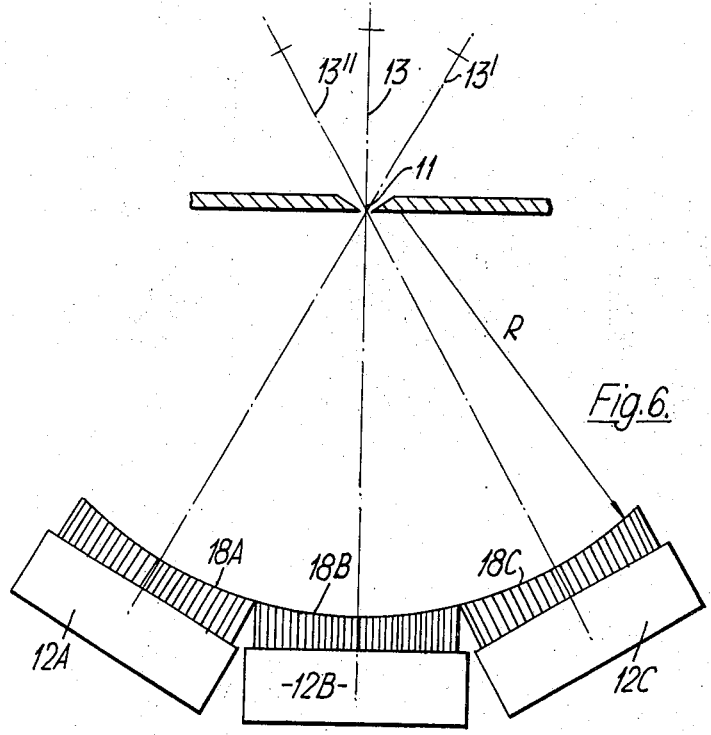

Arrangements according to the invention will now be described by way of example and with reference to the accompanying drawings, in which:

FIG. 1 is a diagrammatic elevation of an optical instrument embodying the invention, FIG. 2 is a graphical presentation of curves illustrating the effectiveness of the instrument of FIG. 1, FIG. 3 shows a practical version of the instrument of FIG. 1 for use as a sun sensor, and FIGS. 4, 5 and 6 illustrate various possible modifications of the arrangements of FIGS. 1 and 3.

Referring firstly to FIG. 1, this shows an optical instrument in which the incoming optical signal 14 passes through an entrance slit 11 at the top of the instrument and is projected on to an array of small photo diode cells 12 covering the floor of the instrument. Such a device can be employed as part of an attitude control system for a satellite since, according to the orientation of the satellite, and hence of the instrument, with respect to the sun, the angle $\theta$ between the entering beam 14, and the optical axis 13 of the instrument will vary and consequently the beam projection 15 within the instrument beyond the entrance slit 11 falls on the photo diode array 12 at a varying distance from the centre 16 of the array so that the photo diode output which gives a measure of this distance also gives an indication of the angle $\theta$. However, the distance measured by the photo diode array 12 does not vary in proportion to the angle $\theta$ but in accordance with the tangent of the angle which is a non-linear function. The inaccuracy involved in assuming the function to be linear is tolerable for small values of the angle $\theta$ but becomes unacceptable for large values; and there is a requirement for sun sensor instruments for satellites where strict attitude control is necessary and the angle $\theta$ may be up to 30°.

To alleviate the problem it is known to provide in the instrument a block of refracting material, such as Spectrosil, for the purpose of reducing the angle between the optical axis and the beam projected within the instrument. FIG. 1 shows such a refractor 17 of refractive index $\mu$ which reduces the divergence between the beam 15 and the axis 13 to the angle $\phi$ which is less than the entry angle $\theta$. However, this order of reduction still leaves an unacceptable inaccuracy for large angles of $\theta$.

According to the embodiment of the invention shown diagrammatically in FIG. 1, a corrector device 18 is interposed between the refractor 17 and the photo diode array 12, which device is made of a multiplicity of fibre optical elements the axes of which are all parallel to the optical axis 13, i.e. they are normal to the plane of the photo diode array 12 which is itself at right angles to the axis 13. The face 19 of this fibre optics device that is contiguous with the photo-diode array is flat, while the opposite or upper face 20 is part of a cylindrical surface of radius R centered upon an axis that intersects the optical axis 13 of the instrument at a point 21 that lies above the entry slit 11, i.e. outside the instrument on the far side of the slit from the refractor 17 and fibre optics device 18, said axis on which the cylindrical surface 20 is generated being parallel to the slit 11.

With this arrangement, the beam 15 within the refractor 17, after striking the lens face 20 at point 22, proceeds through the fibre optics device 18 in a direction parallel to the optical axis 13, as at 23, to impinge on the photo diode array at point 24.

Let $t$ = the maximum thickness of the refractor 17 measured along the optical axis 13;

$f$ = the distance parallel to the optical axis from the slit 11 to the point 22;

$d$ = the distance across the photo diode array from the optical centre 16 to the point 24;

$\beta$ = the "output" angle, i.e. the magnitude of the instrument output indication, which equals Kd where K is an instrument constant.

The instrument error is represented by $\beta - \theta$

We have $$\sqrt{R^2 - d^2} - (R - t) = f \qquad (1)$$

$$\tan \phi = d/f$$

Substituting in equation (1)

$d/\text{Tan } \phi = \sqrt{R^2-d^2}-(R-t)$ $\therefore \sqrt{R^2-d^2} = ([d/\text{Tan } \phi]+c)$ where $c=(R-t)$ (2)

By squaring equation (2) we have $R^2-d^2 = (d^2/\text{Tan}^2 \phi)+(2 cd/\text{Tan } \phi)+c^2$ (3)

putting $a=R/t$ in equation (3) we obtain a quadratic equation in $(d/t)$ as follows:

$([1/\text{Tan}^2 \phi]+1) (d/t)^2+2[(a-1)/\text{Tan } \phi] (d/t)-(2a-1)=0$ giving $d/t=-\text{Sin}^2 \phi \{(a-1/\text{Tan } \phi)\pm \sqrt{(a-1/\text{Tan } \phi)^2+(2a-1/\text{Sin}^2 \phi)}\}$ Now $\text{Sin}^2 \phi/\text{Tan } \phi = \text{Sin}^2 \phi \text{ Cos } \phi/\text{Sin } \phi = \text{Sin } \phi \text{ Cos } \phi = \frac{1}{2}\text{Sin } 2\phi$ using which the repression for $d/t$ becomes $d/t=-\frac{1}{2}\text{Sin } 2\phi(a-1)\pm\text{Sin } \phi \sqrt{a^2-(a-1)^2 \text{Sin}^2 \phi}$ Now as $\phi \to 0$, $\phi=\theta/\mu$ and $d=\phi t=c\theta/\mu)t$ For correct instrument sensitivity at the null $\beta=\theta$ $\therefore K d=\mu d/t$, hence the constant, $K$ must have the value: $K=\mu/t$ and $\beta=\mu d/t=-\text{Sin } \theta \sqrt{1-(\text{Sin}^2\theta\mu^2)} (a-1)\pm\text{Sin } \theta \sqrt{a^2-(a-1)^2(\text{Sin}^2\theta/\mu^2)}$ from which $\beta=\text{Sin } \theta(a-1) [\sqrt{(a/a-1)^2-\text{Sin}^2\theta/\mu^2}-\sqrt{1-(\text{Sin}^2\theta/\mu^2)}]$ and since error $=\beta-\theta$ the expression for error becomes:

$\text{Sin } \theta(a-1) [\sqrt{(a/a-1)^2-\text{Sin}^2\theta/\mu^2}-\sqrt{1-(\text{Sin}^2\theta/\mu^2)}]-\theta$ It will be observed that the value of this expression is dependent on the entry angle $\theta$, the refractive index $\mu$ and the parameter $a=R/t$. Consequently, instrument error can be controlled by selection of the ratio $R/t$.

FIG. 2 shows a series of curves of error or $\beta-\theta$ plotted against entry angle $\theta$. Curve A is for an instrument with no correction at all. Curve B is for an instrument having a fused silica refractor of $\mu=1.453$. Curves C, D and E are for instruments with a fibre optics correcting lens. In curve C no refractor is employed and the value of $a=R/t$ for the instrument is 1.520. In curve D a refractor of $\mu=1.453$ is employed and the value of $a=R/t$ is 1.509. Curve E is also for an instrument with a refractor of $\mu=1.453$ and the higher value for $a=R/t$ of 1.520. The horizontal broken lines M indicate the positive and negative maximum permitted instrument error for the particular case under consideration.

It will be seen that, in the absence of the fibre optics correcting lens, curves A and B very soon exceed the error limit in the positive-going sense. Curves C, D and E show that, even without a refractor, the error when a fibre optics lens is employed remains very small until an entry angle of 30° is exceeded. The instrument can thus deal satisfactorily with entry angles up to 35° at full scale, as indicated by the vertical bar FS; and in the case of curve E the error is still quite tolerable even at entry angles greater than 60°.

FIG. 3 shows a practical configuration of the instrument for use as a sun sensor in a satellite. A shading edge 25 is used in place of the slit 11 and instead of being in contact with the photo diode array 12, the fibre optics correcting device 18 is shown separated from the diode array by a considerable distance, with a lens interposed at 26. This is because there may, in practice, be problems in placing the photo diodes immediately in contact with the ends of the fibre optical elements and such difficulties are avoided by interposing the additional lens.

Results obtained from such a design of sun sensor with and without a fibre optics corrector device show that where the sun angle is measured by detecting the position of a shadow on a flat surface photo diode array the instrument suffers from severe non-linearity — typically 5° error at 35° input angle, as shown by curve A FIG. 2.

By the addition of the fibre optics corrector this error can be reduced by a factor of 1/5000 the residual inherent non-linearity errors being typically:

| Refractor | Range (F.S) | Max. Error | See Curve |
|---|---|---|---|
| Spectrosil | ± 35° | ± 0.0011°=±0.003% F.S. | D |
| Spectrosil | ± 55° | ± 0.01°=0.02% F.S. | E |
| (none) | ± 35° | ±0.013°=0.04% F.S. | C |

Many variations are possible without departing from the scope of the invention. Thus as shown in FIG. 4, a multiple entrance slit may be employed instead of a single slit, so that the incoming optical signal falls on the photo diode array 12 as a succession of lines to give a vernier effect. It is within the scope of the invention to use a fibre optics correcting device 18 without a refractor, as will have been understood from the results displayed in FIG. 2, and such an arrangement is illustrated in FIG. 5.

FIG. 6 shows a modification in which the photodiode array is divided up into three successive sections 12A, 12B, 12C each disposed in a plane at right angles to a line from the entrance slit 11 to its centre point, so that only the centre section 12B is at right angles to the optical axis 13, the two sections 12A and 12C on either side of it being tilted by equal angles in opposite directions. This has the effect of dividing the total angle $\theta$ with which the instrument has to deal into three sections, i.e. of creating two additional optical axes 13', 13'', with the result that the instrument error becomes reduced to that appertaining to an instrument with a full scale capability of only a third of the actual full scale capability. In other words, if the full scale capability is 30°, the maximum error will only be that appearing at $\theta=10°$ on the curves of FIG. 2.

The photo diode array may, of course, be divided in this way into any desired practical number of sections, without any restriction to the arrangement of three sections shown in FIG. 6. Furthermore, each section may be equipped with its own individual fibre optics correcting device 18A, 18B, 18C.

Although the schemes illustrated deal with variation of the entrance angle $\theta$ in one plane only, it will be understood that an instrument can readily be designed to deal with variations in two orthogonal planes by the provision of two orthogonally disposed entrance slits each associated with an appropriately oriented photo diode sensor array and fibre optics corrector. Another possibility is the employment of a "pin-hole" entrance and a surface 20 that is part of a sphere of radius R centred on the point 21, instead of cylindrical.

Referring again to FIG. 2, it will be observed that when the fibre optics correcting device is employed, the instrument error first becomes positive by a small amount as $\theta$ increases from zero and then changes sign and becomes increasingly negative. A considerable advantage is thereby achieved in that, by appropriate choice of the value of $a=R/t$, the cross over point at which the error falls to zero after being positive can be adjusted to any desired value of $\theta$.

Although the practice of the invention has been described in the context of the sun sensor, it is, as already indicated, not limited to this. Another field of application is line scan instruments in which a rotating mirror repeatedly sweeps a flying spot across a record medium and the same tan law error arises if the record medium is flat. The techniques described herein can likewise be applied to correct that error, the axis of rotation of the mirror then taking the place of the entrance slit.

I claim:

1. An optical instrument wherein an optical signal is projected on to a sensor array or sensitive medium and angular deflections of the path of the optical signal about an instrument signal source as centre appear as displacements from a datum lying in the general plane of the sensor array or sensitive medium the instrument having an optical axis passing through said source and normal to said plane, characterised in that, to correct for the tangent law error that would otherwise arise, a correcting optical device is interposed in the signal path and has its surface receiving the signal curved, in the concave sense, about a centre lying on or intersecting the optical axis of the instrument, the curvature being of radius R, where R is greater than the distance $t$ from said instrument signal source to the point in said curved surface that lies on said optical axis, the surface of the correcting optical device facing the sensor array being plane.

2. An instrument according to claim 1, wherein the correcting optical device comprises a multiplicity of fibre optical elements all arranged parallel to the optical axis and normal to said plane surface and of varying lengths.

3. An instrument according to claim 1 wherein the instrument signal source is a slit or a series of parallel slits or a shading edge, upon which falls light from source external to the instrument, and the curved surface of the correcting optical device is a part-cylindrical surface generated about an axis parallel to the slit or slits or shading edge.

4. An instrument according to claim 1, wherein the instrument signal source is a point source, e.g. a "pinhole" aperture, and the curved surface of the correcting optical element is a part-spherical surface.

5. An instrument according to claim 1 wherein a refractory body is interposed between the instrument signal source and the correcting optical device, being contiguous with the curved surface of said device.

6. An instrument according to claim 1 wherein the plane surface of the correcting optical device is spaced from the sensor array and a lens is interposed.

7. An instrument according to claim 1 wherein the sensor array comprises a multiplicity of photo-diode cells.

8. An instrument according to claim 1 having a number of angularly-displaced optical axis mutually intersecting at the instrument signal source, and wherein the sensor array is divided into sections each disposed in a plane at right angles to a respective optical axis.

9. An instrument according to claim 8, wherein each sensor array has a respective correcting optical device disposed between itself and the instrument signal source.

* * * * *